United States Patent
Connick, Jr.

(10) Patent No.: US 6,348,648 B1
(45) Date of Patent: Feb. 19, 2002

(54) SYSTEM AND METHOD FOR COORDINATING MUSIC DISPLAY AMONG PLAYERS IN AN ORCHESTRA

(76) Inventor: Harry Connick, Jr., c/o Wilkins Management, 323 Broadway, Cambridge, MA (US) 02139

( * ) Notice: Subject to any disclaimer, the term of this patent is extended or adjusted under 35 U.S.C. 154(b) by 0 days.

(21) Appl. No.: 09/447,916

(22) Filed: Nov. 23, 1999

(51) Int. Cl.$^7$ .............................................. G09B 15/02
(52) U.S. Cl. ...................... 84/477 R; 84/600; 84/615; 84/653; 84/483.2
(58) Field of Search ................... 84/600–602, 609–610, 84/615, 634, 645, 649–650, 653, 666, 477 R, 478, 483.1, 483.2

(56) References Cited

U.S. PATENT DOCUMENTS

| | | | |
|---|---|---|---|
| 4,635,519 A | 1/1987 | Sakurai | 84/1.17 |
| 4,779,510 A | 10/1988 | Van den Abbeel | |
| 4,976,182 A | 12/1990 | Obuchi et al. | |
| 5,146,833 A | * 9/1992 | Lui | 84/477 R |
| 5,254,803 A | 10/1993 | Terao | |
| 5,315,911 A | 5/1994 | Ochi | |
| 5,400,687 A | 3/1995 | Ishii | |
| 5,463,925 A | 11/1995 | Galocy | 84/423 R |
| 5,507,215 A | 4/1996 | Lin | 84/423 |
| 5,521,324 A | 5/1996 | Dannenberg et al. | |
| 5,590,282 A | 12/1996 | Clynes | |
| 5,665,927 A | * 9/1997 | Taki et al. | 84/477 R |
| 5,728,960 A | * 3/1998 | Sitrick | 84/477 R |
| 5,908,996 A | 6/1999 | Litterst et al. | |

FOREIGN PATENT DOCUMENTS

| WO | 98/50900 | 11/1998 |
|---|---|---|

OTHER PUBLICATIONS

"Music Object Oriented Distributed System", http://arguirre.dsi.unifi.it/~hpen/wwwmoods/moods/mood-seuro.htm; printed Jun. 23, 1999.

"Coda Music Technology"; http:/www.codamusic.com/coda/; printed Nov. 1, 1999.

Brochure: "Music Write Plus"; Voyetra Technologies, Inc.

Brochure: "Cubase VST, Music Recording and Editing System"; Steinberg Soft–und Hardware GmbH.

Brochure: "The First Worldwide Music Production Software, Cubase VST"; Steinberg Soft–und Hardware GmbH.

* cited by examiner

Primary Examiner—Marlon T. Fletcher
(74) Attorney, Agent, or Firm—Brown Raysman Millstein Felder & Steiner LLP

(57) ABSTRACT

A system and method for coordinated music composition and display among musicians is presented. The system and method enables a conductor, composer or band leader to interactively edit one or more score parts of a composition using a pen-based interface, mouse, alphanumeric keyboard, or a musical keyboard. Hand-written music editing, which is entered with the pen-based interface, may be flexibly converted to a digital music notation format. Connected to the composer station are one or more musician stations that may be arranged as an orchestra. The musical score parts may be selectively transmitted to one or more musician stations by the composer. Thus, an operator of the conductor station can flexibly write and edit music score parts and transmit the parts to musicians over the network. The system and method can also be used to conduct the orchestra in rehearsals or performances.

42 Claims, 14 Drawing Sheets

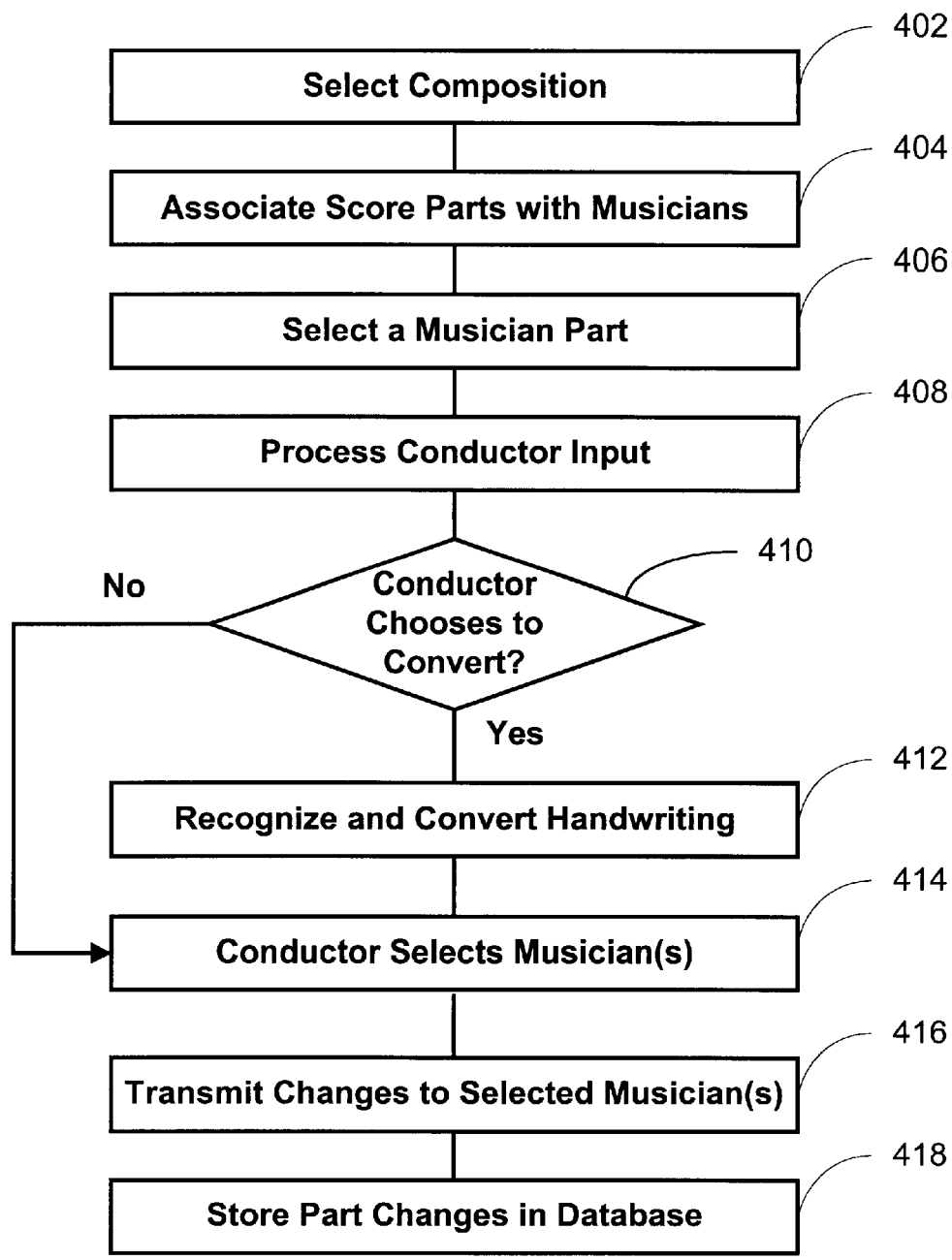

SYSTEM AND METHOD FOR COORDINATING MUSIC DISPLAY AMONG PLAYERS IN AN ORCHESTRA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates to computerized systems for composing and displaying musical scores. In particular, the present invention is an improved user interface and system that allows a conductor or composer to interactively modify a musical score and to transmit the modifications to individual musicians or selected groups of musicians in an orchestra.

Traditionally, printed paper copies of sheet music have been required for any orchestral or band musician to read in order to perform a musical score. The use of such printed sheet music has resulted in certain disadvantages, such as the need to turn pages, the risk of losing pages, and the time consuming task of making edits or changes to musical scores, which may involve reprinting the score. In addition, the use of printed sheet music limits the ability of the conductor of the orchestra to make changes during a rehearsal, concert or performance, and also unduly restricts the composition process.

Several systems have been developed for allowing the composition and notation of music on a computer. Examples of such systems include the FINALE music composition and notation software available from Coda Music Technology, Inc. of Minnesota, the MUSIC WRITE PLUS software from Voyetra Technologies Inc. of New York, the CUBASE VST system available from Steinberg North America of California, and the SIBELIUS music software available from Sibelius Software, Ltd. of the United Kingdom. These systems generally allow for the composition and editing of a musical score through a mouse or keyboard using a note palette or template, or through a MIDI compatible keyboard.

U.S. Pat. No. 5,665,927, assigned to Casio Computer Co., Ltd., describes a hand-held device that uses a pen-based input device for music notation. A touch screen of the device displays a musical staff and provides a method for the user to enter musical notations directly onto the displayed staff using the pen-based input device.

These software and systems provide some basic tools for the computerized composition and editing of music.

The Music Object Oriented Distributed System, or MOODS, is an integrated system of computer-based lecterns or stands which can be used for cooperatively editing and viewing musical scores. The MOODS system, which is described in a document retrievable on the Internet at <http://aguirre.dsi.unifi.it/~moods>, is designed for use by, among other things, orchestras during rehearsals and public performances.

The MOODS system is comprised of a set of lecterns for musicians for displaying musical scores; a lectern for conductors that is used to show, visualize or modify a score; a network for connecting these lecterns; and a database for storing and retrieving the musical scores. The musicians' lecterns are organized according to a hierarchy within the orchestra, with first level musicians being qualified to perform changes on a score while other musicians can be active or passive. This hierarchical organization allows a first instrument such as a first violinist, to directly transmit changes in the score to the other sub-lecterns.

Similarly, PCT application No. PCT/US98/08658, published Nov. 12, 1998, describes a musical score display and editing system in which a band leader's device distributes display information to other devices. The leader may create modifications to a score using various music editing commands which are displayed on all devices displaying parts of the score to which they apply. The system also allows individual musicians to insert personal annotations into their own parts of the score, to be displayed on their own individual devices.

Despite this activity, to the inventor's knowledge there is no system which simplifies and facilitates the conductor's or composer's task of managing and coordinating score modification and dissemination. That is, none of these systems allow the conductor to work with a computerized device in the same fashion as if working with hard copy of sheet music and to fully control the extent to which others in an orchestra receive and view modifications to a score on an automatic, real-time basis. Furthermore, there is no fully integrated music display system that is self-contained, ergonomically designed, flexibly reconfigured, or easily transported. The present invention is directed to improvements that provide these advantages.

SUMMARY OF THE INVENTION

It is an object of the present invention to solve the problems described above associated with existing musical composition systems.

It is another object of the present invention to provide an intuitive user interface for a music editing system through which a conductor of an orchestra can change musical scores for all or some players in the orchestra.

It is another object of the present invention to integrate handwritten editing changes with a fully digital music composition and performance system.

It is another object of the present invention to provide an ergonomic and fully integrated system for multi-part musical composition and conducting.

The above and other objects are achieved by a method and system for facilitating multi-part score composition and conducting an orchestral performance, the method being implemented in a network of computerized devices each containing programming for displaying music on a display device, the computerized devices being used by each of a plurality of players in the orchestra under direction of the conductor. The method involves the step of registering an identity of an instrument in use by each player and the corresponding computerized device being used by the player. This allows the conductor to know which player and which instrument are using each device.

During a composition session or performance, the conductor enters at the conductor's computerized station one or more changes to a musical arrangement. These changes may be entered in a handwritten format, via an integrated piano keyboard, mouse, or keyboard. The conductor's computerized device contains a digitizer and touch screen for processing the input received from the conductor, and also contains means for converting the input changes from handwritten format to a digital music notation format. The means for handwriting conversion may be a music handwriting recognition program such as described above in relation to U.S. Pat. No. 5,665,927, which is hereby incorporated by reference into this application.

The conductor's station allows the conductor to select whether the input change is to be sent to all players in the orchestra or only to a selected group of one or more players who may be using an instrument impacted by the change. The conductor's station also allows the conductor to select whether the change should be converted to a digital music notation format before transmission to the players. If the conductor selects to send the change only to the player or players using an instrument impacted by the change, the conductor's station determines which instrument or instruments are impacted by the change and identifies the corresponding computerized device or devices registered for that instrument. The change is then transmitted over the network to the players in accordance with the conductor's selections.

One of the features of the system of the present invention that sets it apart from other computer-based score editors and related applications is the user interface. The conductor and other musicians are able to write directly onto the display screen, just as with any palm computing device, allowing for immediate note changes, edits, and other musical explorations. Thus, the musician will not have to edit using dialog boxes or keyboard commands, and simply takes an electronic pen and writes the desired changes directly onto the screen. For example, to replace a quarter note with a half note, all the musician would have to do is draw a half note on the staff, just as though it were on paper. The half note remains in a handwritten format until the musician explicitly decides to convert the handwritten representation to a digital music notation using a handwriting recognition application.

Because all of the computers in the band or orchestra are networked, the band leader or conductor can make a universal edit for all musicians at a rehearsal or performance from a central station and transmit the edited score to all of the other musicians simultaneously. The conductor could also make changes on an individual part as well. For example, if the conductor wanted the trumpet section to repeat four bars, the players would have the option to make the required changes individually or simply accept the changes made by the conductor.

The computer, display screen, operating system, and application are integrated into a single self-contained unit. Because everything is in one unit, external wiring and other clutter are eliminated reducing setup time, effort and possible errors. The unit housing the computerized device is large enough and provides sufficient display resolution to represent standard pages of printed music, while remaining compact and light enough to be portable. This allows for the musicians to comfortably travel to and from rehearsals, recordings and performances with the device. New musical scores and parts are distributed by discs, or other digital storage methods, which can be used directly by the computerized device. This eliminates the need for extraneous paper parts or bulky folders full of sheet music. Furthermore, any confusion about which is the most current or correct version of a musical score is eliminated. An entire music catalog can now be placed in a back pocket.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 4 is a flow chart showing an exemplary process of leading an orchestra using the system shown in FIG. 1;

DETAILED DESCRIPTION OF THE PREFERRED EMBODIMENTS

Preferred embodiments of the present invention are now described with reference to the drawings in the Figures.

Figure 1:
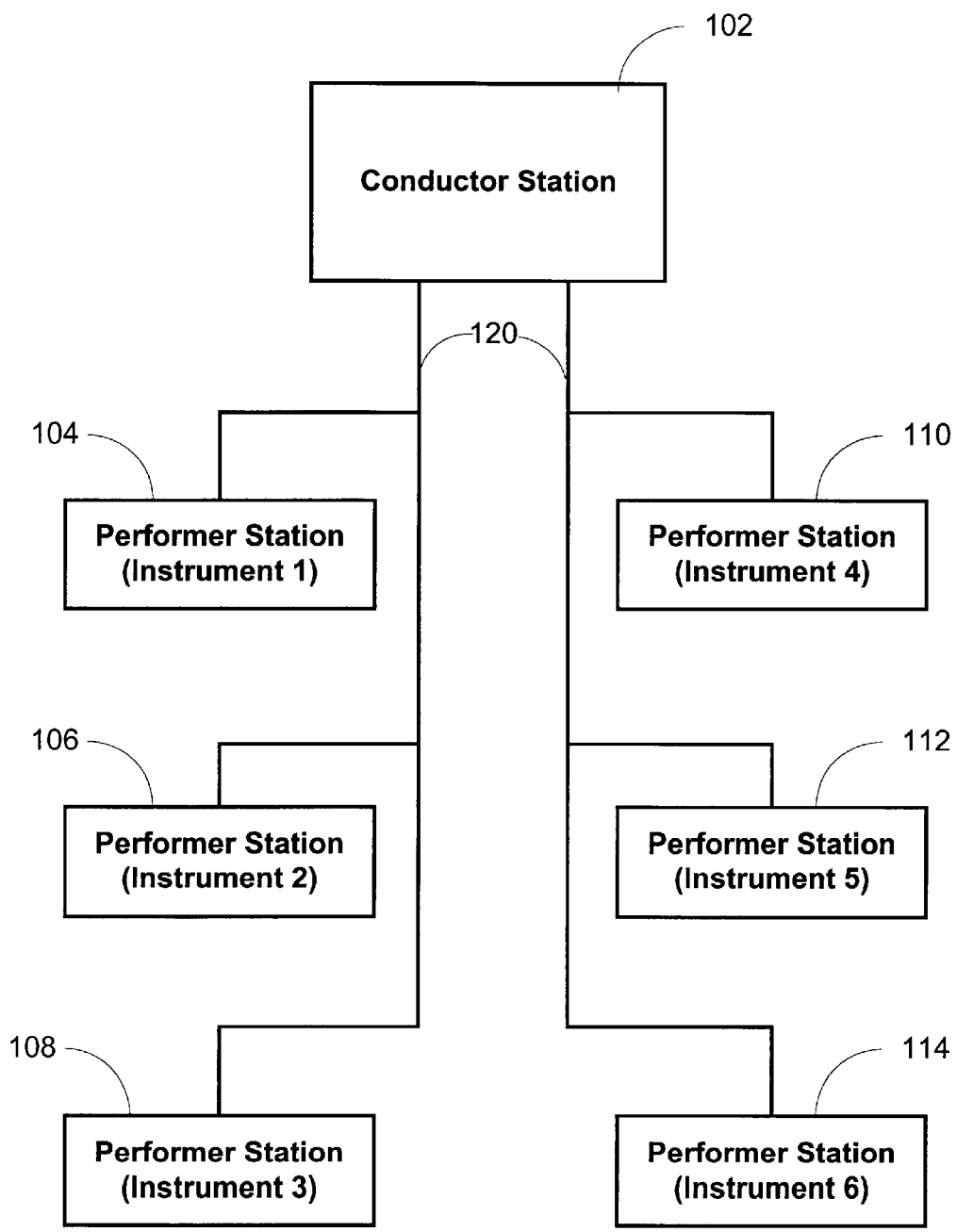
FIG. 1 shows an exemplary network of computerized musical composition devices in accordance with one embodiment of the present invention.

Referring to FIG. 1, a schematic diagram of an example orchestral configuration is presented with a single conductor station 102 and six musician stations, 104, 106, 108, 110, 112, and 114. The conductor station 102 is connected to the musician stations 104–114 by a computer network 120, which may be based on one of a number of networking technologies such as the Internet, a proprietary networking protocol such as the Token Ring system, or a wireless networking technology. These stations may be located in relatively close proximity or may be located at any distance from each other.

Figure 2:
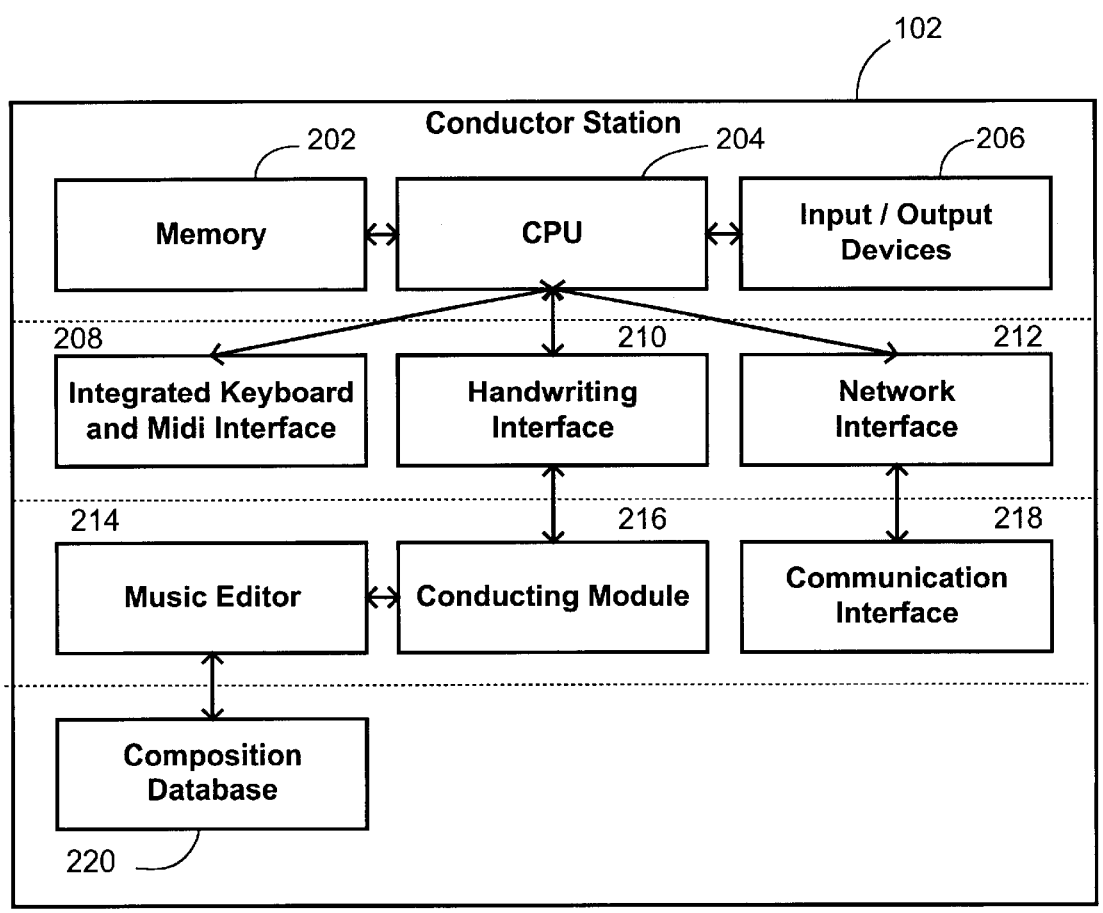
FIG. 2 is a block diagram of an exemplary musical composition device in accordance with one embodiment of the present invention.

Referring to FIG. 2, a block diagram of the conductor station is presented. The conductor station includes a general purpose central processing unit (CPU) 204 that is connected to a memory 202 and one or more input/output devices 206. The CPU 204 is also connected to an integrated keyboard and MIDI interface 208 that provides input from an integrated alphanumeric keyboard and musical keyboard, described hereinbelow, or other musical device interface. Also connected to the CPU 204 is a network interface 212 used to access the other musician stations 104–114 on the network 120, and enables the conductor to transmit and receive information from the other musician stations 104–114 using a communications interface 218. Connected to the CPU 204 is a handwriting recognition system 210 that processes pen strokes to determine music edits, system commands, and other user input.

Executing on the CPU 204 are several software modules. The conducting module 216 provides program features for composing and conducting music and distributing the musical score to musicians on the network. Accessible to the conducting module is a general music score editing program 214 such as the FINALE system, described hereinabove. Underlying the system and connected to the conducting module and the music editor is a composition database 220 that may contain musical data such as musical compositions, scores, parts, and other information.

Figure 3A:
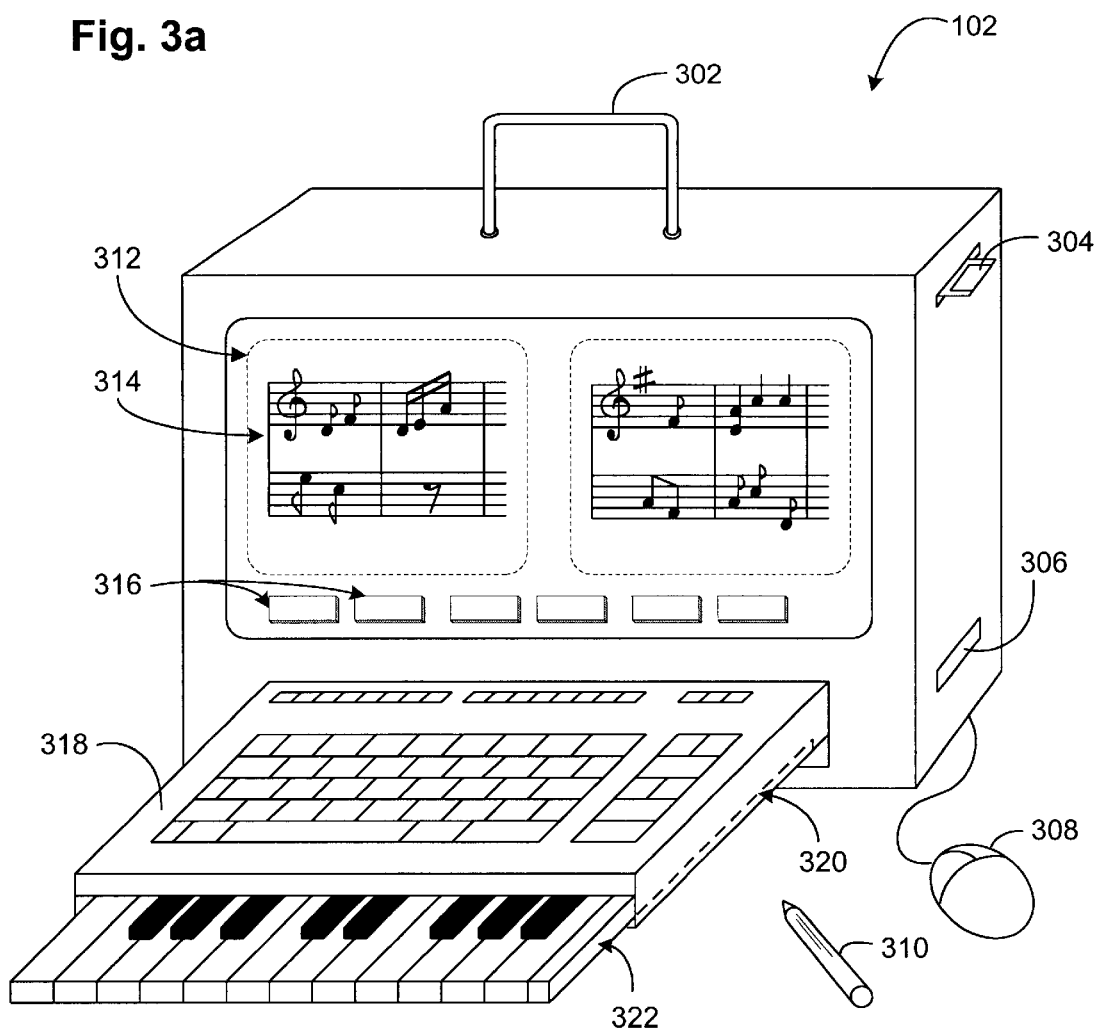
FIG. 3a is a perspective view of an exemplary musical composition device of FIG. 2.

With reference to FIG. 3a, a generalized exemplary music composition device is shown. The machine includes a display screen 312, which is a touch screen capable of detecting handwritten input made by a stylus or digital pen 310. The stylus 310 may be connected to the system 102 by a connecting wire or via a wireless system such as an infrared communication system. The display screen 312 shows musical score pages 314 as well as command icons 316 that activate various system functions. These buttons are context sensitive in that they change when the system is performing different functions or operating in different modes. Integrated into the device is a carrying handle 30, a floppy diskette 304, a removable media storage device such as a ZIP drive 306 or other magnetic or optical storage device. A mouse 308 or other pointing device is also provided that may be used to operate the system.

The device also includes an integrated keyboard assembly that integrates an alphanumeric keyboard 318, such as typically used with a computer, with a musical keyboard 322. In one embodiment of the present inventions, the alphanumeric keyboard 318 and musical keyboard 322 may be connected by a sliding track 320 that allows the musical keyboard to slide into the alphanumeric keyboard. Additional embodiments of the keyboard assembly are described hereinbelow.

Figure 3B:
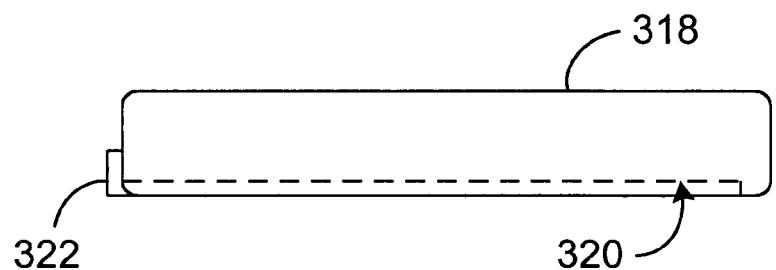
FIG. 3b is a side view of the keyboard assembly of a first embodiment of the present invention with the keyboard in a closed position.
Figure 3C:
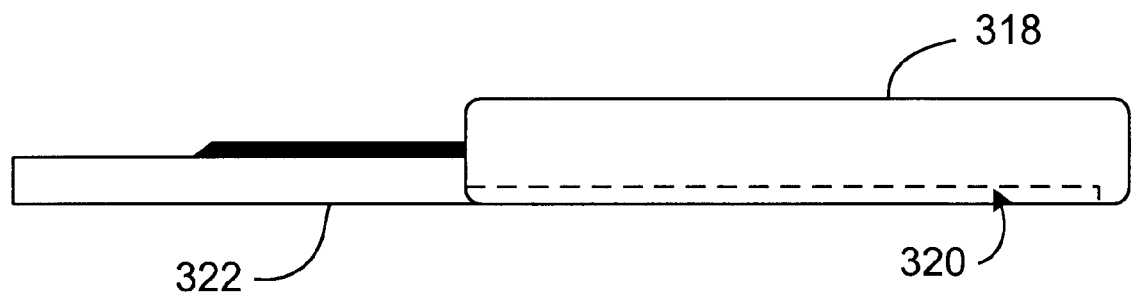
FIG. 3c is a side view of the keyboard assembly of a first embodiment of the present invention with the keyboard in an open position.
Figure 3D:
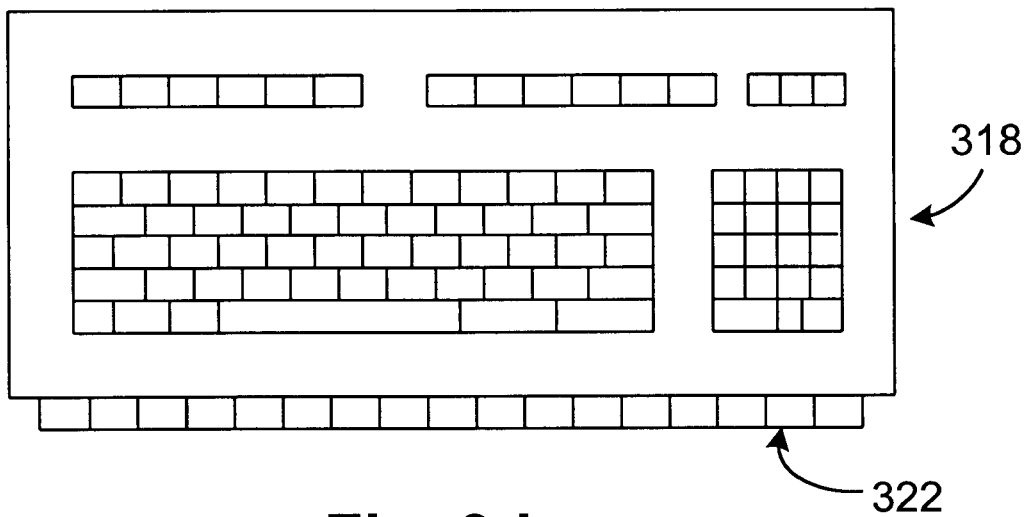
FIG. 3d is a top view of the keyboard assembly of a first embodiment of the present invention with the keyboard in a closed position.
Figure 3E:
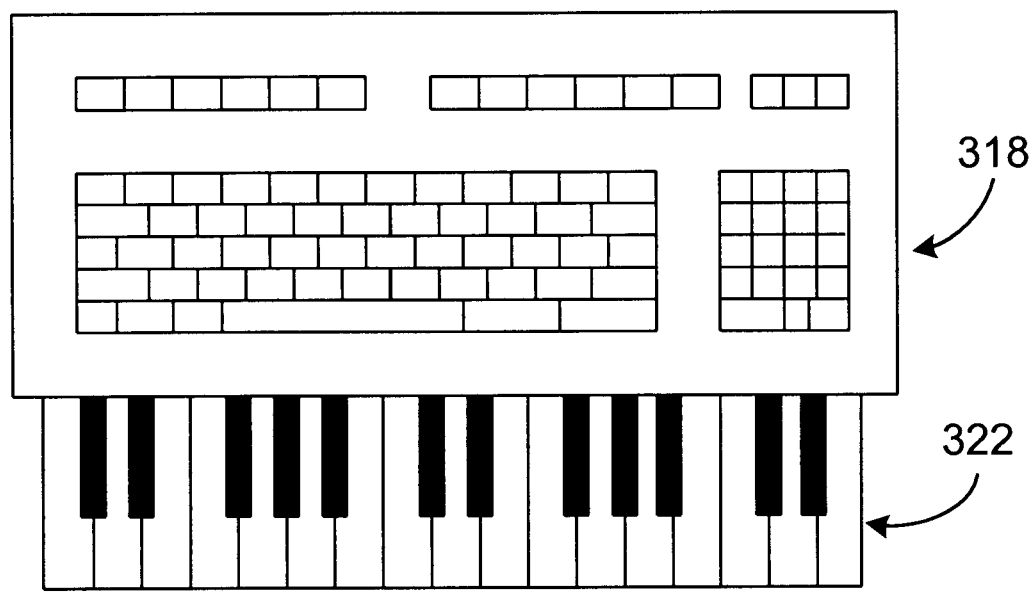
FIG. 3e is a side view of the keyboard assembly of first embodiment of the present invention with the keyboard in an open position.

With reference to FIGS. 3b–3e, a first embodiment of a keyboard of the present invention is described. In FIG. 3b the keyboard is shown in the closed position with the musical keyboard 322 slid under or into the alphanumeric keyboard 318 along a guide or track 320. FIG. 3c shows the keyboard in the open position with the musical keyboard 322 extended along the track 320 of the alphanumeric keyboard 318, so that both keyboards are simultaneously accessible. FIG. 3d shows a top view of the keyboard with the musical keyboard 322 slid into the alphanumeric keyboard 318; and, FIG. 3e shows the same top view with the musical keyboard 322 extended from the alphanumeric keyboard 318.

Figure 3F:
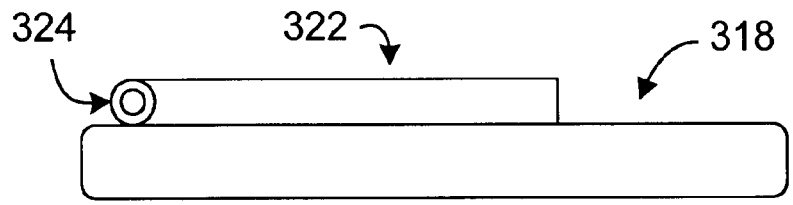
FIG. 3f is a side view of the keyboard assembly of a second embodiment of the present invention with the keyboard in a closed position.
Figure 3G:
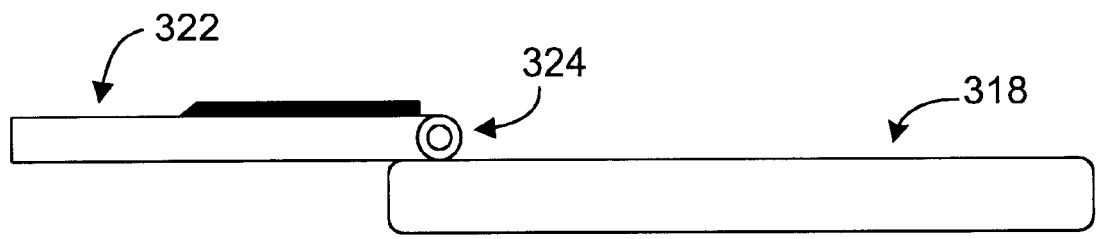
FIG. 3g is a side view of the keyboard assembly of a second embodiment of the present invention with the keyboard in an open position.
Figure 3H:
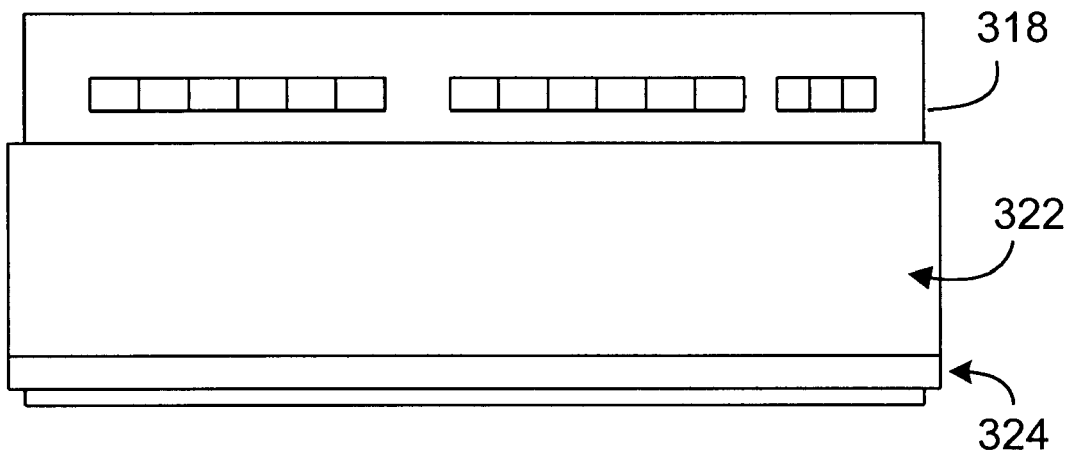
FIG. 3h is a top view of the keyboard assembly of a second embodiment of the present invention with the keyboard in a closed position.
Figure 3I:
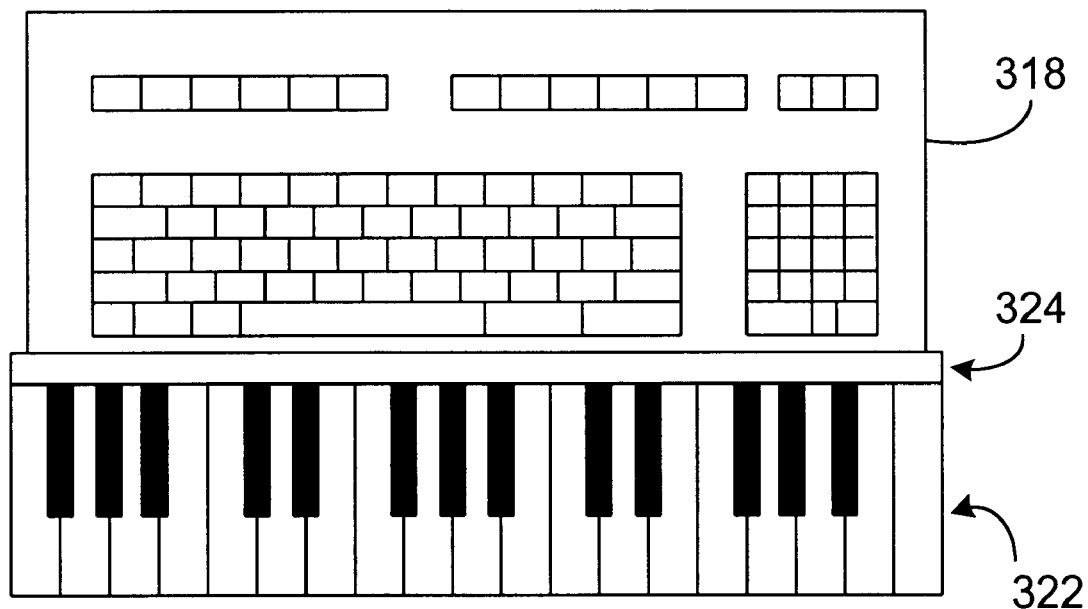
FIG. 3i is a top view of the keyboard assembly of a second embodiment of the present invention with the keyboard in a closed position.

With reference to FIGS. 3f–3g, a second embodiment of a keyboard of the present invention is described. In FIG. 3f the keyboard is shown in the closed position with the musical keyboard 322 folded over the alphanumeric keyboard 318 by a hinge or other attachment 324. FIG. 3g shows the keyboard in the open position with the musical keyboard 322 attached to alphanumeric keyboard 318 by the hinge in the open position 320, so that, once again, both keyboards are simultaneously accessible. FIG. 3d shows a top view of the keyboard with the musical keyboard 322 folded onto the alphanumeric keyboard 318; and, FIG. 3e shows the same top view with the musical keyboard 322 folded open from the alphanumeric keyboard 318.

It is hereby noted that in the above descriptions, in which the musical keyboard 318 is the movable component, the order of coupling of the musical keyboard 318 and the alphanumeric keyboard 322 may be switched such that the alphanumeric keyboard 322 is the movable component. For example, with respect to FIGS. 3b–3e the alphanumeric keyboard 322 may slide into the musical keyboard 318, and with respect to FIGS. 3f–3i the alphanumeric keyboard 322 may fold onto the musical keyboard 318.

Figure 3J:
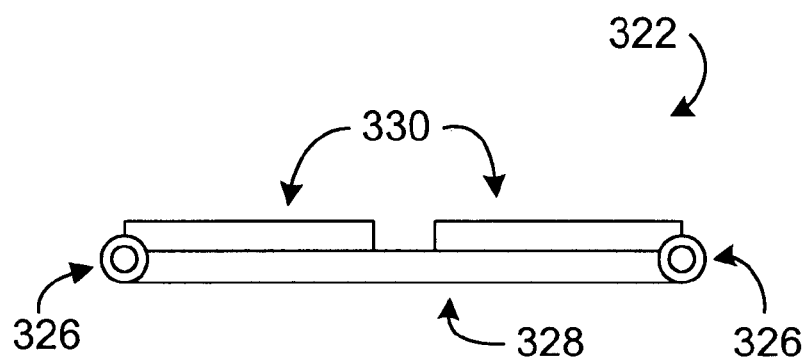
FIG. 3j is a side view of the keyboard assembly of a third embodiment of the keyboard of the present invention with the keyboard in a closed position.
Figure 3K:
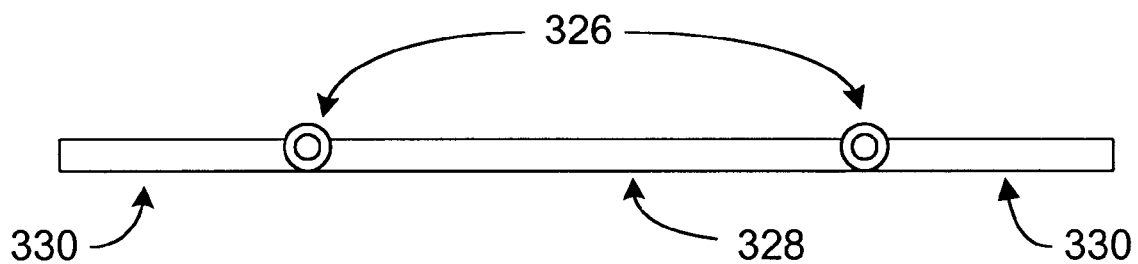
FIG. 3k is a side view of the keyboard assembly of the third embodiment of the keyboard of the present invention with the keyboard in an open position.
Figure 3L:
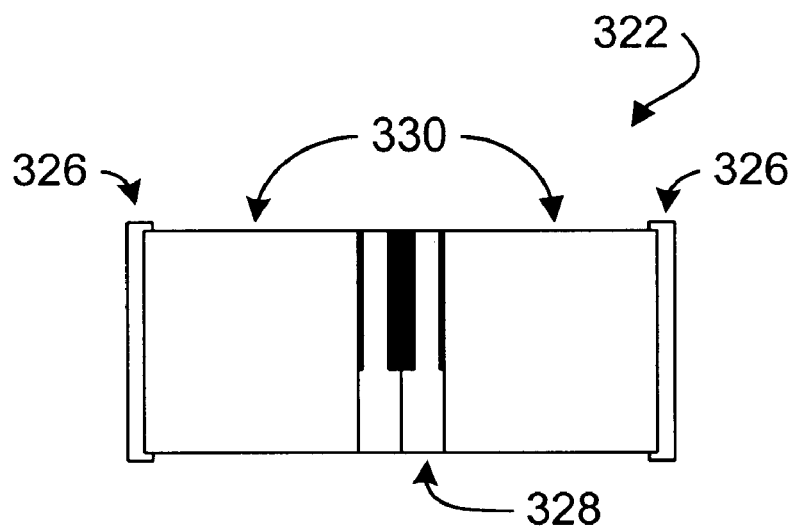
FIG. 3l is a top view of the keyboard assembly of the third embodiment of the keyboard of the present invention with the keyboard in a closed position.
Figure 3M:
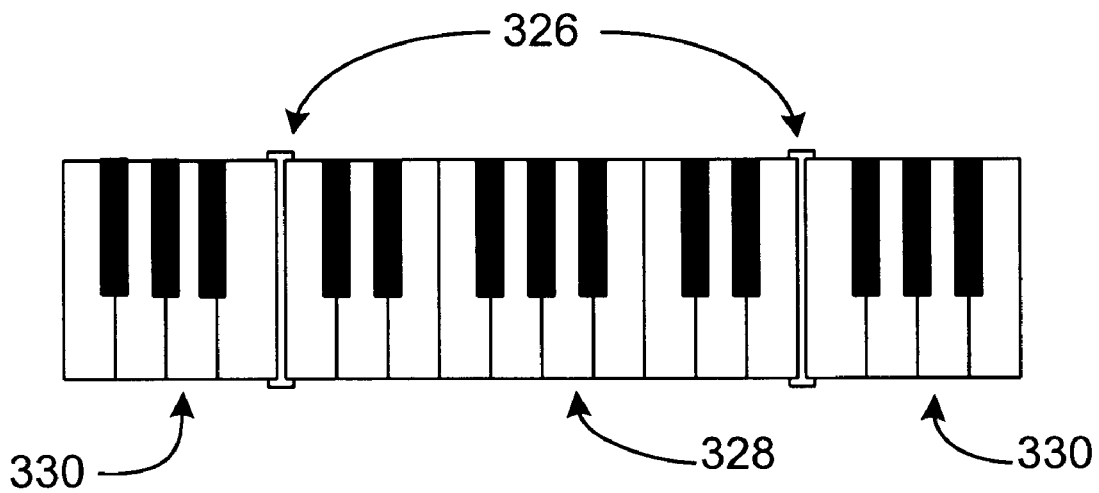
FIG. 3m is a top view of the keyboard assembly of a third embodiment of the keyboard of the present invention with the keyboard in an open position.

With reference to FIGS. 3j–3m, a third embodiment of the musical portion of the keyboard assembly of the present invention is described. This configuration, called a 'butterfly', permits a musical keyboard 322 that is wider than the alphanumeric keyboard 318. With reference to FIG. 3j the butterfly keyboard is shown in the closed position where the keyboard 322 is segmented into a center portion 328 and two side portions 330, also called wings, that are joined by two hinges 326. FIG. 3k shows the butterfly keyboard in the open position with the two wings 330 opened to be level with the center portion 328 to form a single wide keyboard 322. FIG. 3l shows a top view of the butterfly keyboard 322 with hinges 326 in the closed position and the wings 330 folded onto the alphanumeric keyboard 318; and, FIG. 3e shows the same top view with the butterfly keyboard 322 folded open from the center portion of the keyboard 318.

Figure 3N:
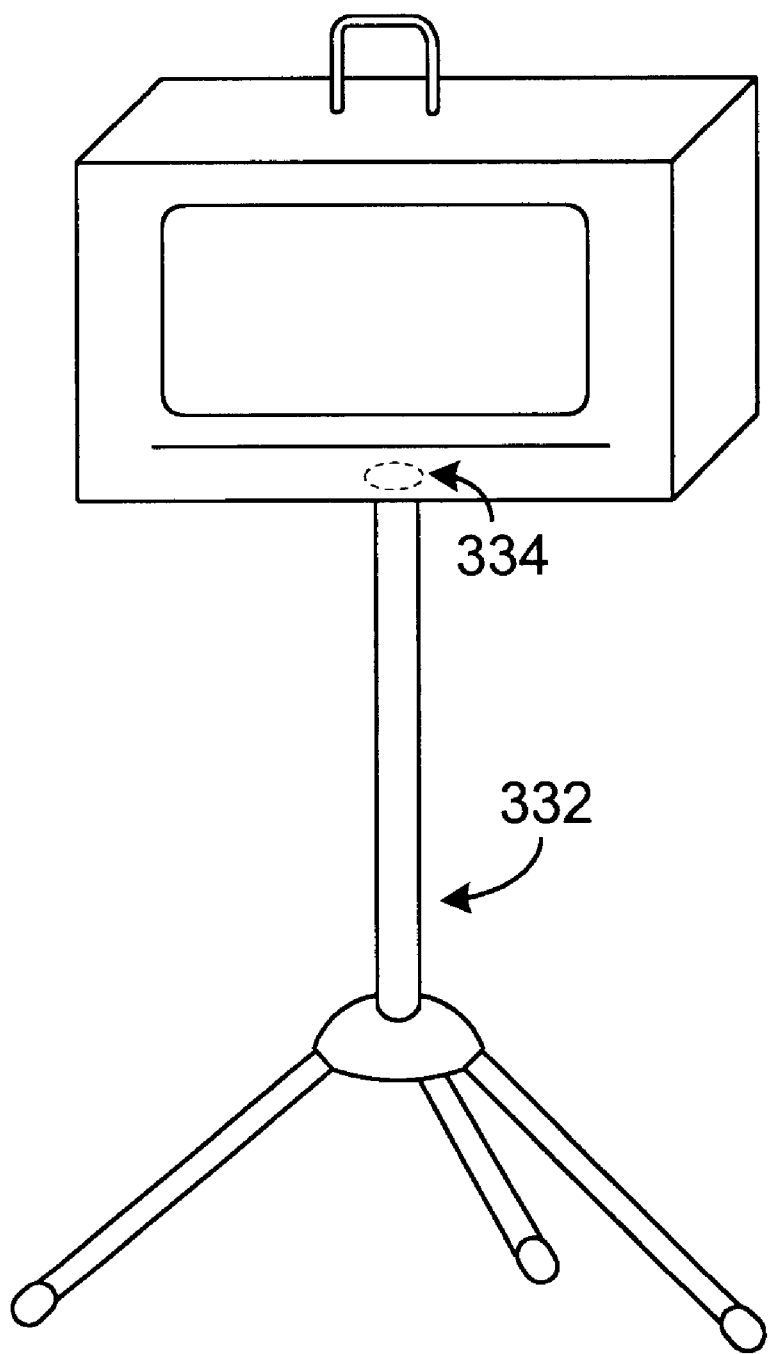
FIG. 3n is a perspective view of the musical composition device of FIG. 3a mounted on a music stand.

With reference to FIG. 3n, the music display system 102 is described mounted by a joint, adapter, or threaded screw 334 on top of a music stand or lectern 332. In one embodiment of the present invention the joint 334 enables the music display system 102 to tilt and swivel so that a comfortable viewing angle may be produced.

With reference to FIG. 4, a flow diagram describing the general operation of the system is presented. In step 402 the conductor selects a composition, or alternately creates a new composition. The composition will include one or more score parts, each score part corresponding to a musician and associated musician station in the orchestra. The conductor associates or registers the part with the corresponding musician or musician station in step 404. Alternatively, the musicians preregister their identity and/or instrument and station ID, which data is sent to and stored in the conductor's station for use and access by the conductor in selecting musicians stations to receive changes, e.g., by selecting an option to send changes only to those instruments affected by the changes. The system then can store the association so that the conductor is not required to reenter the association information. The conductor then selects a part, step 406, that corresponds to an individual musician or a group of musicians, in order to view, modify or transmit that score part. Once the score part is selected, the conductor can process the part using editing marks that are recognized by the handwriting system, step 408. The conductor then chooses whether to convert the handwritten changes to digital music format, step 410. If the conductor decides to finalize the handwritten edit changes, the system recognizes and converts the handwritten edit markings into digital music notation in step 412. The conductor then chooses which musician stations will receive the changes, e.g., all stations or just stations associated with affected instruments, step 414. The changes are then transmitted to the one or more selected musician stations on the network at step 416. The resulting changes to the musical score can also be saved in step 416.

Figure 5:
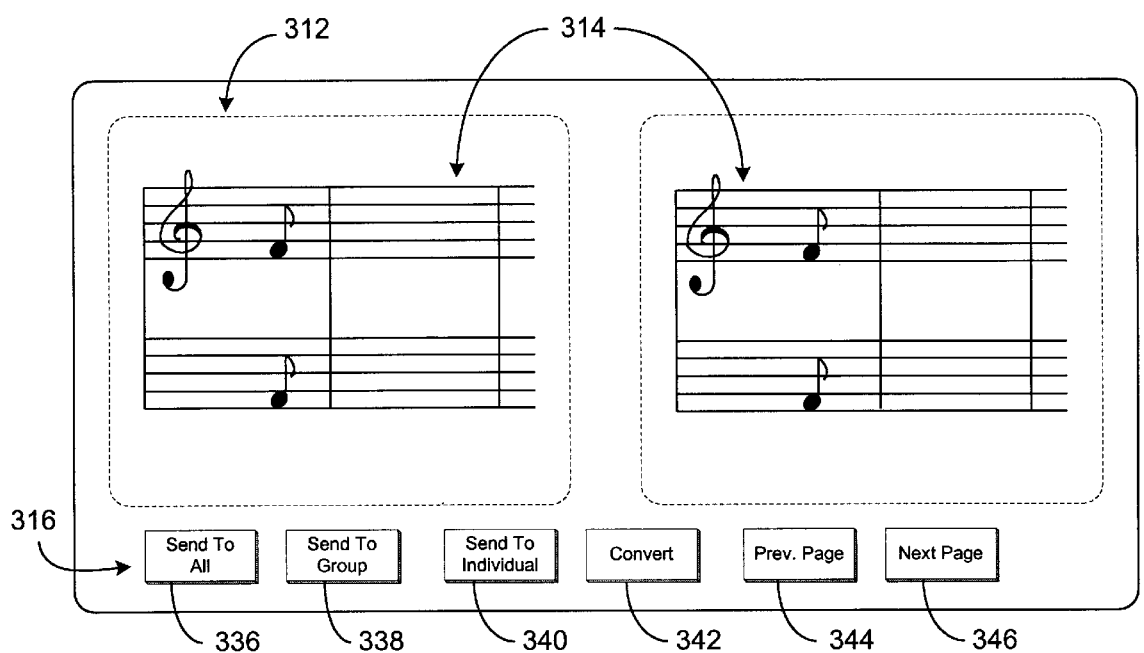
FIG. 5 is an exemplary screen display for the device of FIGS. 2 and 3 showing an exemplary set of active control buttons.

With reference to FIG. 5, a detail view of the editing screen of the conductor system is shown. This screen display shows two pages of a musical score 314, drawn schematically. Below the musical score display 314 are a set of icons or buttons 316 that provide system functionality. In the example, screen six buttons 336–346 are active, although a greater or smaller number may be present and the location of the buttons 316 may vary. The text or symbols on the buttons 316 change when the system is executing different processes or modules. The six buttons in the present view, described from left to right are: a button that transmits the score to all musicians 336; a button that sends the score to a selected group of musicians 338, a button that sends the score to an individual musician 340. The next button 342, when selected, converts handwritten score changes into a digital music notation format. The next button 344 displays the previous score page, and the last button 346 displays the next score page.

Figure 6A:
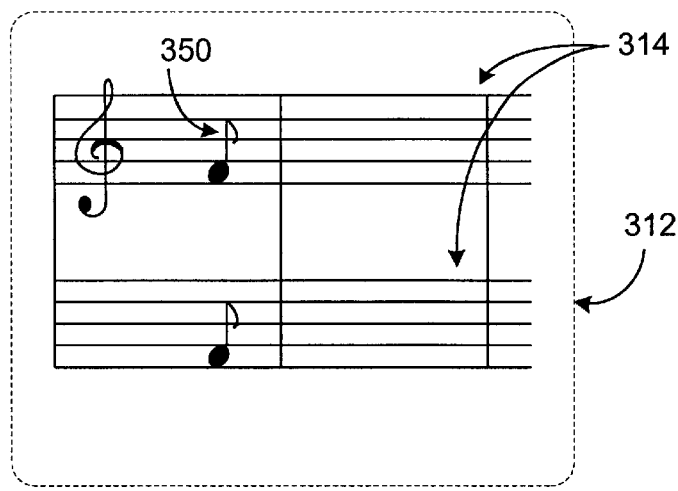
FIGS. 6a–6c and 7a–7b represent exemplary sequences of screen displays generated during operation of one embodiment of the present invention.
Figure 6B:
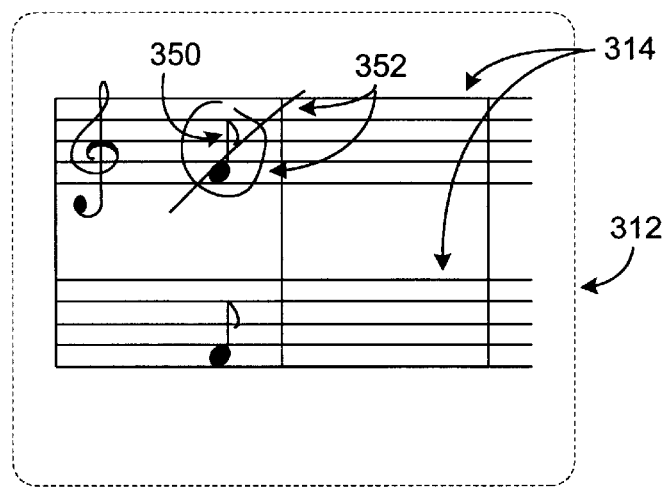
Figure 6C:
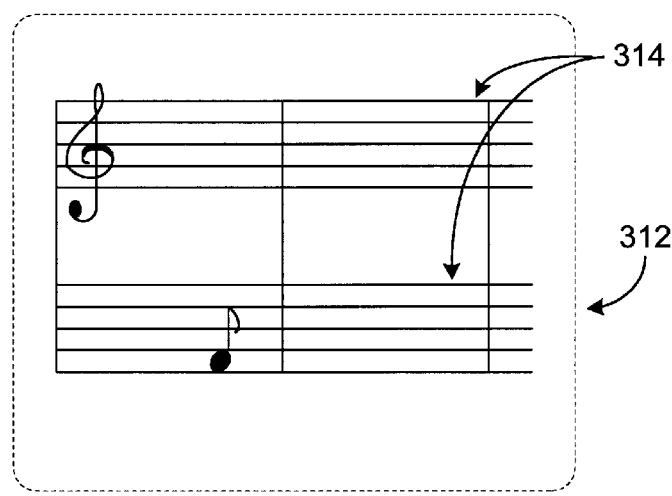

With respect to FIGS. 6a–6c, an example of a simple music edit is described. FIG. 6a shows the abstracted score 314 on the display 312 of the present invention with a music note 350 displayed. In FIG. 6b, a handwritten music annotation 352, in this case an annotation to delete note 350 of the score 314 on the display 312, is shown. In FIG. 6c, the handwritten annotation 352 has been converted to digital music notation and note 350 is deleted from the score 314 on the display 312.

Figure 7A:
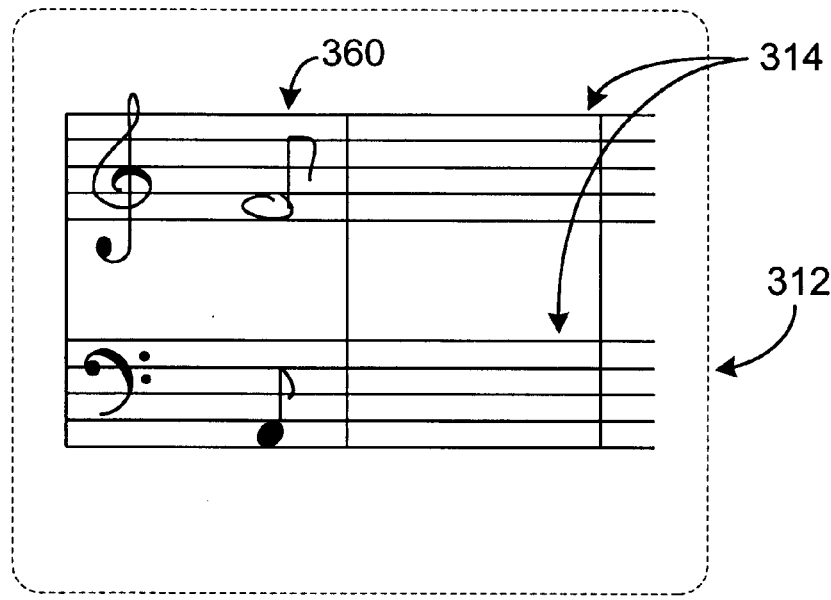
Figure 7B:
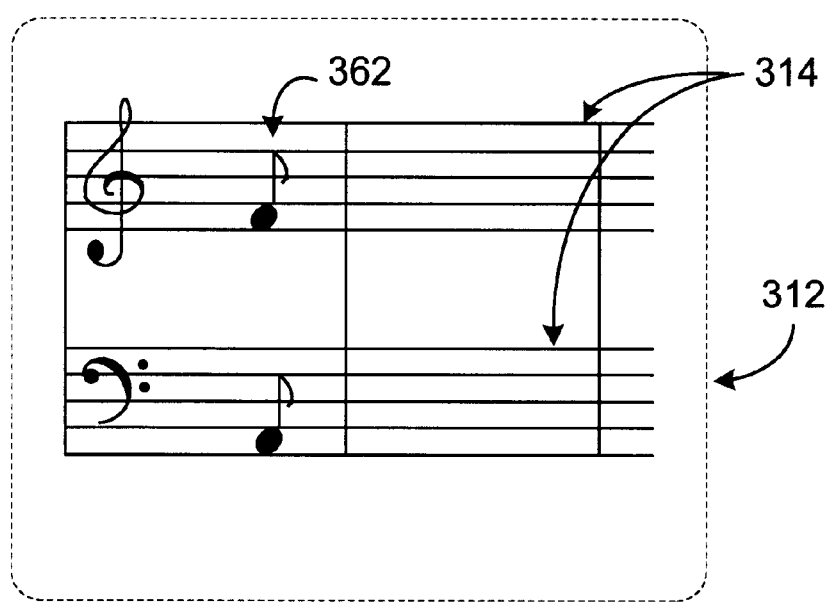

With respect to FIGS. 7a–7b, an example of adding a musical note is shown. In FIG. 7a, a hand drawn whole note 360 is drawn by the conductor on the score 314 on the display 312. In FIG. 7b, the whole note 350 is shown on the score 314 of the display 312 after it has been converted into a digital musical notation format.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. In a network of computerized devices each containing programming for displaying music on a display device, the computerized devices being used by each of a plurality of players in an orchestra under direction of a conductor, a method for facilitating leading of the orchestra, the method comprising:

registering an identity of an instrument in use by each player and the corresponding computerized device being used by the player;

receiving at a computerized device in use by the conductor a change to a musical arrangement represented in a handwritten format, the conductor's computerized device comprising means for converting changes from handwritten format to electronic music type format;

allowing the conductor to select whether the change is to be sent to all players in the orchestra or only to one or more players using an instrument impacted by the change;

if the conductor selects to send the change only to the player or players using an instrument impacted by the change, determining which instrument or instruments are impacted by the change and identifying the corresponding computerized device or devices registered for that instrument;

allowing the conductor to select whether the change should be converted to electronic music type format before transmission to the one or more players; and transmitting the change to one or more players in accordance with the conductor's selections.

2. The method of claim 1, wherein the step of receiving the conductor's change comprises receiving the change through a touch screen display device.

3. The method of claim 1, wherein the step of receiving the conductor's changes comprises receiving the changes through a digitizer and electronic stylus.

4. The method of claim 1, comprising displaying the changes in the received handwritten format on the conductor's computerized device.

5. The method of claim 4, comprising displaying the changes in the received handwritten format on the player's computerized devices to which the changes are transmitted.

6. The method of claim 5, comprising converting the changes from the received handwritten format to an electronic format for display on each player's computerized devices.

7. A graphical user interface system for a musical composition and orchestration system, the method comprising:

means for allowing a conductor to electronically input a change to a musical score displayed on a display device in a handwritten format;

means for allowing the conductor to select whether an input change is to be transmitted to all of a plurality of players in an orchestra or only to those one or more players playing an instrument affected by the change;

means for determining which one or more players are affected by the input change;

means for allowing the conductor to select whether to convert the handwritten change to a music type format prior to transmission of the change to the player or players; and means for transmitting the change to the player or players in accordance with the conductor's selections.

8. The system of claim 7, comprising a musical keyboard operatively coupled to a computer keyboard.

9. In a network of computerized devices each containing programming for displaying music on a display device, the computerized devices being used by a plurality of players in an orchestra under direction of a conductor, a method for facilitating leading of the orchestra, the method comprising:

receiving at a computerized device in use by the conductor a change represented in a handwritten format to a musical arrangement, the conductor's computerized device comprising means for converting changes from handwritten format to electronic music type format;

allowing the conductor to select whether the change should be converted to electronic music type format before transmission to at least one player of the plurality of players; and transmitting the change to the at least one player in accordance with the conductor's selection.

10. The method of claim 9, wherein the step of receiving the conductor's change comprises receiving the change through a touch screen display device.

11. The method of claim 9, wherein the step of receiving the conductor's change comprises receiving the change through a digitizer and electronic stylus.

12. The method of claim 9, comprising displaying the change in the received handwritten format on the conductor's computerized device.

13. The method of claim 9, comprising displaying the change in the received handwritten format on computerized devices of players to which the change is transmitted.

14. The method of claim 9, comprising converting the change from the received handwritten format to an electronic format for display on computerized devices of players to which the change is transmitted.

15. The method of claim 9, comprising displaying the changes on the conductor's computerized device having a musical keyboard operatively coupled to a computer keyboard.

16. The method of claim 9, comprising displaying the change on the at least one player's computerized device having a musical keyboard operatively coupled to a computer keyboard.

17. A graphical user interface system for a musical composition and orchestration system, the system comprising:
means for allowing a conductor to electronically input a change in a handwritten format to a musical score displayed on a conductor's display device;
means for allowing the conductor to select whether to convert the handwritten change to a music type format prior to transmission of the change to at least one player; and
means for transmitting the change to the at least one player in accordance with the conductor's selection.

18. The system of claim 17, wherein the conductor's display device comprises a musical keyboard operatively coupled to a computer keyboard.

19. The system of claim 17, comprising means for displaying the changes a display device of the at least one player, wherein the display device of the at least one player comprises a musical keyboard operatively coupled to a computer keyboard.

20. In a network of computerized music display devices, a method for facilitating communication of a change to a musical composition from a first computerized music display device of the network to one or more other computerized music display devices of the network, the one or more other computerized music display devices being for use by one or more players in an orchestra, the method comprising:
allowing a conductor, using the first computerized music display device, to enter the change to a portion of the musical composition;
allowing the conductor to select, from at least two different display formats, a first display format of the at least two different display formats in which the changed portion of the musical composition is to be sent to the one or more other computerized music display devices; and
sending the changed portion of the musical composition to the one or more other computerized music display devices to be displayed in the selected first display format.

21. The method of claim 20, wherein the first display format displays a handwritten change.

22. The method of claim 20, wherein allowing a conductor to enter the change comprises the first computerized music display device displaying at least a portion often musical composition.

23. The method of claim 22, wherein allowing a conductor to enter the change comprises allowing the conductor to enter the change through a touch screen display device.

24. The method of claim 22, wherein allowing a conductor to enter the change comprises allowing the conductor to enter the change through a digitizer and electronic stylus.

25. The method of claim 22, wherein allowing a conductor to enter the change comprises allowing the conductor to enter the change through at least one of a musical keyboard, alphanumeric keyboards and an integrated musical-alphanumeric keyboard.

26. The method of claim 22, comprising displaying the changed portion on the first computerized music display device.

27. The method of claim 20, wherein the first display format is a handwritten format, and wherein sending the changed portion of the musical composition to the one or more other computerized music display devices to be displayed in the selected first display format comprises sending the changed portion of the musical composition to the one or more other computerized music display devices to be displayed in a handwritten format.

28. The method of claim 20, wherein the first display format is ax electronic type format, and wherein sending the changed portion of the musical composition to the one or more other computerized music display devices to be displayed in the selected first display format comprises sending the changed portion of the musical composition to the one or more other computerized music display devices to be displayed in an electronic type format.

29. The method of claim 20, wherein allowing the conductor to select a first display format in which the changed portion is to be sent to one or n: ore other computerized music display devices comprises allowing the conductor to assign at least one of the one or more other computerized music display devices to at least one of a plurality of conductor-actionable buttons.

30. The method of claim 29, wherein actuating one of the conductor-actionable buttons sends the changed portion to at least one of a single, a plurality, and all of the one or more other computerized music display devices.

31. The method of claim 20, wherein sending the changed portion to the one or more other computerized music display devices comprises sending the changed portion to those at least one of the one or more computerized music display devices identified by the conductor.

32. The method of claim 20, wherein the one or more other computerized music display devices display the changed portion in the selected first display format.

33. The method of claim 20, further comprising at lest temporarily recording the change.

34. The method of claim 33, comprising recording the change using a removable media storage device comprising at least one of a magnetic media removable recording device and an optical media removable recording device.

35. The method of claim 20, wherein the at least two different display formats consist of two display formats, and wherein allowing the conductor to select, from at least two different display formats, a first display format comprises allowing the conductor to select, from the two display formats, a first display format.

36. The method of claim 20, wherein the at least two different display formats consist of a handwritten format and an electronic type format, and wherein allowing the conductor to select, from at least two different display formats, a first display format comprises allowing the conductor to select the handwritten format and the electronic type format, a first display format.

37. A computer usable medium storing program code which, when executed on a computerized device, causes the computerized device to execute, in, a network of computerized music display devices, a method for facilitating communication of a change to a musical composition from a first computerized music display device of the network to one or more other computerized music display devices of the network, the one or more other computerized music display devices being for use by one or more players in an orchestra, the method comprising:

allowing a conductor, using the first computerized music display device, to enter the change to a portion of the musical composition;

allowing the conductor to select, from at least two different display formats, a first display format of the at least two different display formats in which the changed portion of the musical composition is to be sent to the one or more other computerized music display devices; and sending the changed portion of the musical composition to the one or more other computerized music display devices to be displayed in the selected first display format.

38. The computer usable medium of claim 37, wherein allowing a conductor to enter the change comprises the first computerized music display device displaying at least a portion of the musical composition.

39. The computer usable medium claim 37, wherein the method comprises displaying the changed portion on the first computerized music display device.

40. The computer usable medium of claim 37, wherein the method comprises recording the change using a removable media storage device comprising at least one of a magnetic media removable recording device and an optical media removable recording device.

41. The computer usable medium of claim 37, wherein the at least two different display formats consist of two display formats, and wherein allowing the conductor to select, from at least two different display formats, a first display format comprises allowing the conductor to select, from the two display formats, a first display format.

42. The computer usable medium of claim 37, wherein the at least two different display formats consist of a handwritten format and an electronic type format, and wherein allowing the conductor to select, from at least two different display formats, a first display format comprises allowing the conductor to select, from the handwritten format and the electronic type format, a first display format.

\* \* \* \* \*